(12) United States Patent
Sharma et al.

(10) Patent No.: US 11,146,941 B2
(45) Date of Patent: Oct. 12, 2021

(54) COMMUNICATION SYSTEM

(75) Inventors: Vivek Sharma, London (GB); Yassin Aden Awad, London (GB)

(73) Assignee: TOKYO CORPORATION, Tokyo (JP)

( * ) Notice: Subject to any disclaimer, the term of this patent is extended or adjusted under 35 U.S.C. 154(b) by 0 days.

(21) Appl. No.: 14/129,152

(22) PCT Filed: Jul. 2, 2012

(86) PCT No.: PCT/JP2012/067412
§ 371 (c)(1),
(2), (4) Date: Dec. 24, 2013

(87) PCT Pub. No.: WO2013/005855
PCT Pub. Date: Jan. 10, 2013

(65) Prior Publication Data
US 2014/0140293 A1 May 22, 2014

(30) Foreign Application Priority Data

Jul. 4, 2011 (GB) ........................................ 1111374

(51) Int. Cl.
*H04W 8/06* (2009.01)
*H04W 88/06* (2009.01)
*H04L 5/00* (2006.01)

(52) U.S. Cl.
CPC ............... *H04W 8/06* (2013.01); *H04L 5/001* (2013.01); *H04W 88/06* (2013.01)

(58) Field of Classification Search
CPC .................................. H04W 8/06; H04W 88/06
See application file for complete search history.

(56) References Cited

U.S. PATENT DOCUMENTS

2010/0197298 A1 8/2010 So et al.
2010/0279682 A1* 11/2010 Rangaiah et al. ......... 455/426.1
(Continued)

FOREIGN PATENT DOCUMENTS

CN 101409920 A 4/2009
CN 101547477 A 9/2009
(Continued)

OTHER PUBLICATIONS

Japanese Office Action dated Nov. 26, 2014 with a partial English translation thereof.
(Continued)

*Primary Examiner* — Kevin C. Harper
*Assistant Examiner* — Derrick V Rose
(74) *Attorney, Agent, or Firm* — Sughrue Mion, PLLC

(57) ABSTRACT

A communication system is presented in which a base station operates a first cell using a first component carrier and a second cell using a second component carrier. A control channel and reference signals of a first type are provided using the first component carrier. The control channel and the reference signals of the first type are not provided, and reference signals of a second type are provided, using the second component carrier. The base station determines from results of measurements performed on reference signals of the second type whether or not the mobile communication device is within an area covered by said second cell and, if it is, transmits cell configuration information to the mobile communication device.

7 Claims, 6 Drawing Sheets

(56) References Cited

U.S. PATENT DOCUMENTS

| | | | |
|---|---|---|---|
| 2010/0323720 A1* | 12/2010 | Jen | H04B 7/2606 455/456.1 |
| 2010/0331037 A1 | 12/2010 | Jen | |
| 2011/0070880 A1 | 3/2011 | Song et al. | |
| 2011/0105123 A1 | 5/2011 | Lee et al. | |
| 2011/0170496 A1* | 7/2011 | Fong | H04L 5/0053 370/329 |
| 2011/0235743 A1* | 9/2011 | Lee, II | H04L 5/0048 375/295 |
| 2011/0310753 A1 | 12/2011 | Chou et al. | |
| 2012/0076040 A1 | 3/2012 | Hoshino et al. | |
| 2012/0120846 A1* | 5/2012 | Hwang | H04W 24/10 370/254 |
| 2012/0157103 A1 | 6/2012 | Frenger et al. | |
| 2012/0207105 A1* | 8/2012 | Geirhofer | H04L 5/0032 370/329 |
| 2012/0252432 A1* | 10/2012 | Henttonen | H04W 24/10 455/422.1 |
| 2014/0105150 A1* | 4/2014 | Kim et al. | 370/329 |
| 2016/0302099 A1* | 10/2016 | Kim | H04W 24/00 |

FOREIGN PATENT DOCUMENTS

| | | |
|---|---|---|
| CN | 101932089 A | 12/2010 |
| CN | 102045756 A | 5/2011 |
| CN | 102098146 A | 6/2011 |
| EP | 1 855 401 A1 | 11/2007 |
| GB | 2 454 399 A | 1/2008 |
| JP | 2010-154399 A | 7/2010 |
| JP | 2013-534093 A | 8/2013 |
| WO | WO 2009/137180 A2 | 11/2009 |
| WO | WO 2009/153165 A1 | 12/2009 |
| WO | WO 2010/088930 A2 | 8/2010 |
| WO | WO 2010/128909 A1 | 11/2010 |
| WO | 2010/140298 A1 | 12/2010 |

OTHER PUBLICATIONS

Ericsson et al., "On Technical Aspects on Heterogeneous Networks", 3GPP R1-100061, 3GPP TSG-RAN WG1 #59bis, Jan. 18-22, 2010, Valencia, Spain.

Huawei, "CSI-RS Pattern Design", 3GPP R1-103445, 3GPP TSG RAN WG1 meeting #61bis, Jun. 28-Jul. 2, 2010, Dresden, Germany.

Ericsson et al., "Remaining Details of CA based HetNet in Rel-10", 3GPP R1-111323, 3GPP TSG-RAN WG1 #65, May 9-13, 2011, Barcelona, Spain.

Nokia et al., "Initial Simulations for Mobility in Carrier Aggregation", 3GPP R4-102041, 3GPP TSG-RAN WG4 #55, May 10-14, 2010, Montreal, Canada.

Ericsson et al., "On CSI RS Design", 3GPP R1-100048, 3GPP TSG-RAN WG1 #59bis, Jan. 18-22, 2010, Valencia, Spain.

Panasonic, "Details of Extension Carrier", 3GPP R1-094498, 3GPP TSG-RAN WG1 Meeting #59, Nov. 9-13, 2009, Jeju, Korea.

Motorola, "Carrier Aggregation-Activation and Measurements", 3GPP R2-100452, 3GPP TSG-RAN WG2 #68bis, Jan. 18-22, 2010, Valencia, Spain.

Alcatel-Lucent et al., "On CSI RS Design", 3GPP R1-100416, 3GPP TSG-RAN WG1 #59bis, Jan. 18-22, 2010, Valencia, Spain.

Huawei et al., "Discussion on PRS Transmission Collision with CSI-RS", 3GPP R1-110429, 3GPP TSG RAN WG1 meeting #63bis, Jan. 17-21, 2011, Dublin, Ireland.

International Search Report in PCT/JP2012/067412 dated Oct. 31, 2012 (English Translation Thereof).

Motorola Mobi Lity: "Further Discussion on Cross-carrier scheduling for LTE Rel18" s3GPP Draft; R1-111667 Cross Carrier REL18, 3rd Generation Partnership Project T3GPP),Mobile Competence Centre ., 658, Route DESL.,UFCRIOALNECSE, ,. F-86921 Sophia-Antipolis Cedex vol. RAN WG1, No. Barcelona, Spain; 20118589, May 5, 2811 (2811-85-85),XP858491488, [retrieved on 2811-85-85].

3GPP TSG-RAN WG1 Meeting # 590bis, Valencia, Spain, Jan. 18-22, 2010, R1-100359 Panasonic et al: "Possible definition of extension carrier and carrier segment", 3GPP Draft; RI-188359, 3rd Generation Partnership Project (3GPP), Mobile Competence Centre ; 658, Route Des Lucioles ; F-86921 Sophia-Antipolis Cedex; France, vol. RAN WG1, No. Valencia, Spain; 28188118, Jan. 15, 2818 (2818-81-15), XP858418364, [retrieved on 2818-81-15].

3GPP TS 36.211 V10.2.0 (Jun. 2011) 3rd Generation Partnership Project; Technical Specification Group Radio Access Network; Evolved Universal Terrestrial Radio Access (E-UTRA);Physical Channels and Modulation (Release 10).

3GPP TS 36.331 V10.2.0 (Jun. 2011) 3rd Generation Partnership Project; Technical Specification Group Radio Access Network; Evolved Universal Terrestrial Radio Access (E-UTRA);Radio Resource Control (RRC); Protocol specification (Release 10).

3GPP TS 36.133 V10.3.0 (Jun. 2011) 3rd Generation Partnership Project;Technical Specification Group Radio Access Network; Evolved Universal Terrestrial Radio Access (E-UTRA);Radio Resource Control (RRC); Protocol specification (Release 10).

Nokia Corporation et al: "Comparison of CC Management Strategies", 3GPP TSG-RAN WG2 Meeting #70BIS, Jun. 28 to Jul. 2, 2010, R2-103513, 7 pgs. total.

Renesas Electronics Europe et al: "Additional RRM requirements for carrier aggregation", 3GPP TSG-RAN WG4 Meeting #58, Feb. 21-25, 2011, R4-110936, 8 pgs. total.

Communication from the European Patent Office dated Apr. 19, 2016, in corresponding Application No. 16150817.1.

Decision to Grant a Patent dated Mar. 22, 2017 issued by the Japanese Patent Office in counterpart JP application No. 2016-101335.

Communication dated May 30, 2018, from the Japanese Patent Office in counterpart application No. 2017-084533.

NTT Docomo, "Way forward on Glitch issues due to Scell bandwidth retuning" [online], 3GPP TSG-RAN WG4 meeting #57, R4-104046, Internet <URL: http://www.3gpp.org/ftp/tsg_ran/WG4_Radio/TSGR4_57/Docs/R4-104046.zip>, Nov. 15, 2010 (5 pages total).

Research in Motion UK Limited, "Additional issues for CA measurement requirement" [online], 3GPP TSG-RAN WG4 (Radio) Meeting #58, R4-111283, Internet <URL:http://www.3gpp.org/ftp/tsg_ran/WG4_Radio/TSGR4_58/Docs/R4-111283.zip>, Feb. 21, 2011 (3 pages total).

Translation of Communication dated Oct. 20, 2020, from the State Intellectual Property Office of the P.R.C. in application No. 201710849831.X.

Office Action dated Feb. 19, 2020 in Chinese Application No. 201710854773.X.

Ericsson, ST-Ericsson, "Remaining Details for CA-based HetNets", R1-110031, 3GPP TSG RAN WG1 Meeting #63bis, Jan. 17-21, 2011, Dublin, Ireland, 4 pages total.

Communication dated Sep. 20, 2016, from the State Intellectual Property Office of People's Republic of China in counterpart Application No. 201280033280.5.

\* cited by examiner

COMMUNICATION SYSTEM

TECHNICAL FIELD

The present invention relates to mobile communications devices and networks, particularly but not exclusively those operating according to the 3$^{rd}$ Generation Partnership Project (3GPP) standards or equivalents or derivatives thereof. The invention has particular although not exclusive relevance to the Long Term Evolution (LTE) of UTRAN (called Evolved Universal Terrestrial Radio Access Network (E-UTRAN)).

BACKGROUND ART

It has been decided, as part of the 3GPP standardisation process, that downlink operation for system bandwidths beyond 20 MHz will be based on the aggregation of a plurality of component carriers at different frequencies. Such carrier aggregation can be used to support operation in a system both with and without a contiguous spectrum (for example, a non-contiguous system may comprise component carriers at 800 MHz, 2 GHz, and 3.5 GHz). Whilst a legacy mobile device may only be able to communicate using a single, backward compatible, component carrier, a more advanced multi-carrier capable terminal would be able to simultaneously use the multiple component carriers.

Carrier aggregation can be particularly beneficial in a heterogeneous network (HetNet), even when the system bandwidth is contiguous, and does not exceed 20 MHz because multiple carriers enable interference management between different power class cells as well as open access and closed subscriber group (CSG) cells. Long-terra resource partitioning can be carried out by exclusively dedicating carriers to a certain power class of cell (Macro/Pico/CSG).

Further, the need for interference management between different cells operating on component carriers of the same frequency in co-incident or overlapping geographic areas has led to the development of extension carriers (which are not backwards compatible with legacy devices). Extension carriers may be used as a tool for carrier aggregation based HetNet operation and improved spectral efficiency. A multi-carrier capable base station is able to operate at least one of its carriers as an extension carrier, on which a control channel (e.g. a channel carrying resource scheduling information such as the Physical Downlink Control Channel (PDCCH)), a Common reference Signal (CRS) (sometimes referred to as a Cell-specific Reference Signal), and other information cannot be transmitted. To allow the use of an extension carrier, at least one further component carrier of the component carrier set used by the multi-carrier base station must be a stand-alone carrier that can be used to transmit the scheduling information for the extension carrier.

Accordingly, when a first base station is operating a component carrier as an extension carrier, another base station may operate a component carrier of the same frequency to transmit a control channel, a CRS and other such information more reliably, in the same general geographic area as the first base station, without significant interference because there is no corresponding control channel, CRS and other such information on the extension carrier operated by the first base station.

In more detail, an extension carrier comprises a carrier that cannot be operated as a single carrier (stand-alone) carrier, but must be a part of a component carrier set where at least one of the carriers in the set is a stand-alone-capable carrier. An extension carrier may not be used for transmission of any of the following:
- a Physical Downlink Control Channel (PDCCH);
- a Physical Hybrid ARQ Indicator Channel (PHICH);
- a Physical Control Format Indicator Channel (PCFICH);
- a Physical Broadcast Channel (PBCH);
- a Primary Synchronization Signal (PSS);
- a Secondary Synchronization Signal SSS; or
- a Common Reference Signal Cell-specific Reference Signal (CRS).

DISCLOSURE OF THE INVENTION

Problems to be Solved by the Invention

Thus, a base station may operate a primary cell on a first component carrier and a secondary cell on a second component carrier operating as an extension carrier. When a mobile communication device enters the cell of the base station, the base station is able to provide configuration information to the mobile device identifying the radio resource configuration for the primary and secondary cells.

It is possible, however, that the geographical areas covered by the primary cell and secondary cell may not be coincident—either by design, or because the range of the first and second component carriers is different as a result of radio environment conditions. Accordingly, a mobile communication device may enter, communicate from, and then leave the primary cell without ever entering the secondary cell. In such cases the base station may, undesirably, signal the mobile communication device to add the secondary cell configuration (and possibly activate the secondary cell configuration) when the mobile communication device is not within sufficient range of the extension carrier for it to be used as a secondary cell.

The invention therefore aims to provide a mobile communication system, a mobile communication device, a communication node and associated methods which overcomes or at least mitigates the above issues.

Means to Solve the Problems

According to one aspect of the invention there is provided communication apparatus for a cellular communication system, the communication apparatus comprising: means for operating a first cell using a first component carrier and a second cell using a second component carrier, wherein: reference signals of a first type are provided in a control region and in a data region of sub-frames communicated using the first component carrier; the reference signals of the first type are not provided in sub-frames communicated using the second component carrier; and reference signals of a second type are provided in a data region but are not provided in a control region of sub-frames communicated using the second component carrier; means for communicating with a mobile communication device using the first component carrier; means for communicating with the mobile communication device using the second component carrier; means for receiving, from the mobile communication device, results of measurements performed on the reference signals of the first type for the first component carrier and results of measurements performed on the reference signals of the second type for the second component carrier; means for determining, from the results of the measurements performed on the reference signals of the second type, whether or not said mobile communication device is within an area covered by said second cell; and means for transmitting to the mobile communication device, in dependence on whether or not said mobile communication device is within an area covered by said second cell, information for allowing said mobile communication device to communicate using said second component carrier in said second cell.

According to one aspect of the invention there is provided a mobile communication device for communicating with communication apparatus of a cellular communication system, which communication apparatus is configured to operate a first cell using a first component carrier and a second cell using a second component carrier, wherein: reference signals of a first type are provided in a control region and in a data region of sub-frames communicated using the first component carrier; the reference signals of the first type are not provided in sub-frames communicated using the second component carrier; and reference signals of a second type are provided in a data region but are not provided in a control region of sub-frames communicated using the second component carrier; and wherein the mobile communication device comprises: means for communicating with the communication apparatus using the first component carrier; means for communicating with the communication apparatus using the second component carrier; means for performing measurements on the reference signals of the first type for the first component carrier for use in determining a signal strength of the first component carrier, and for performing measurements on the reference signals of the second type for the second component carrier for use in determining a signal strength of the second component carrier; means for reporting, to the communication apparatus, results of the measurements performed; and means for receiving, from said communication apparatus, information for allowing said mobile communication device to communicate using said second component carrier in said second cell in the event that the results of measurements of the reference signals of the second type for the second component carrier indicate that said mobile communication device is within an area covered by said second cell.

According to one aspect of the invention there is provided communication apparatus for a cellular communication system, the communication apparatus comprising: means for operating a first cell using a first component carrier and a second cell using a second component carrier, wherein a control channel and reference signals of a first type are provided using the first component carrier, and wherein the control channel and the reference signals of the first type are not provided, and reference signals of a second type are provided, using the second component carrier; means for communicating with a mobile communication device using the first component carrier; means for communicating with the mobile communication device using the second component carrier; means for receiving, from the mobile communication device, results of measurements performed on the reference signals of the first type for the first component carrier and results of measurements performed on the reference signals of the second type for the second component carrier; means for determining, from the results of the measurements performed on the reference signals of the second type, whether or not said mobile communication device is within an area covered by said second cell; and means for transmitting to the mobile communication device, in dependence on whether or not said mobile communication device is within an area covered by said second cell, information for allowing said mobile communication device to communicate using said second component carrier in said second cell.

The reference signals of the first type may be provided in a control region and in a data region of sub-frames communicated using the first component carrier; and the reference signals of the second type may be provided in a data region and may not be provided in a control region of sub-frames communicated using the second component carrier.

The communication apparatus may further comprise means for providing measurement configuration information to the mobile communication device for configuring said mobile communication device to perform said measurements on the reference signals of the second type.

The determining means may be operable to determine a reference signal received power 'RSRP' for the second component carrier from said received results of measurements performed on the reference signals of the second type.

The determining means may be operable to determine a reference signal received quality 'RSRQ' for the second component carrier from said received results of measurements performed on the reference signals of the second type.

The communication apparatus may comprises at least one of a serving mobile location centre 'SMLC' and a base station.

According to one aspect of the invention there is provided a mobile communication device for communicating with communication apparatus of a cellular communication system, which communication apparatus is configured to operate a first cell using a first component carrier and a second cell using a second component carrier, wherein a control channel and reference signals of a first type are provided using the first component carrier, wherein the control channel and the reference signals of the first type are not provided, and reference signals of a second type are provided using the second component carrier, and wherein: the mobile communication device comprises: means for communicating with the communication apparatus using the first component carrier; means for communicating with the communication apparatus using the second component carrier; means for performing measurements on the reference signals of the first type for the first component carrier, for use in determining a signal strength of the first component carrier and for performing measurements on the reference signals of the second type for the second component carrier, for use in determining a signal strength of the second component carrier; means for reporting, to the communication apparatus, results of the measurements performed; and means for receiving, from said communication apparatus, information for allowing said mobile communication device to communicate using said second component carrier in said second cell in the event that the results of measurements of the reference signals of the second type for the second component carrier, indicate that said mobile communication device is within an area covered by said second cell.

The reference signals of the first type may be provided in a control region and in a data region of sub-frames communicated using the first component carrier; and the reference signals of the second type may be provided in a data region and may not be provided in a control region of sub-frames communicated using the second component carrier.

A mobile communication device according to any of claims 2 or 9 to 10 wherein said measurement means is operable to determine a reference signal received power 'RSRP' for the second component carrier from said reference signal of the second type.

A mobile communication device according to any of claims 2 or 9 to 11 wherein said measurement means is operable to determine a reference signal received quality 'RSRQ' for the second component carrier from said reference signal of the second type.

A mobile communication device according to any of claims 2 or 9 to 11 wherein said measurement means is operable to determine at least one of a rank indicator (RI), precoding matrix indicator (PMI) and a channel quality indicator (CQI) from said reference signal of the second type.

A mobile communication device according to any of claims 2 or 9 to 13 further comprising means for receiving measurement configuration information from the communication apparatus, and means for configuring said mobile communication device to perform said measurements on the reference signals of the second type.

The reference signals of the second type may comprise positioning reference signals 'PRS' and/or may comprise channel state information reference signals 'CSI-RS'. The reference signals of the second type may comprise common reference signals 'CRS' (also known as Cell-specific reference signals 'CRS').

The second component carrier may comprise an extension carrier.

The first carrier may comprise a stand alone carrier.

The control region of the sub-frames may comprise a region normally reserved for a physical downlink control channel 'PDCCH'.

The information for allowing said mobile communication device to communicate using said second component carrier in said second cell may comprise secondary cell configuration information.

The information for allowing said mobile communication device to communicate using said second component carrier in said second cell may comprise an indication to activate said secondary cell at said mobile communication device.

According to one aspect of the invention there is provided a communication system comprising at least one communication apparatus as described above and at least one mobile communication device as described above.

According to one aspect of the invention there is provided a computer program product comprising instructions operable to program a programmable processor to implement communication apparatus as described or a mobile communication device as described above.

According to one aspect of the invention there is provided a method preformed by communication apparatus for a cellular communication system, the method comprising: operating a first cell using a first component carrier and a second cell using a second component carrier, wherein a control channel and reference signals of a first type are provided using the first component carrier, and wherein the control channel and the reference signals of the first type are not provided, and reference signals of a second type are provided, using the second component carrier; communicating with a mobile communication device using the first component carrier; receiving, from the mobile communication device, results of measurements performed on the reference signals of the first type for the first component carrier and results of measurements performed on the reference signals of the second type for the second component carrier; determining, from the results of the measurements performed on the reference signals of the second type, whether or not said mobile communication device is within an area covered by said second cell; and transmitting to the mobile communication device, in dependence on whether or not said mobile communication device is within an area covered by said second cell, information for allowing said mobile communication device to communicate using said second component carrier in said second cell.

According to one aspect of the invention there is provided a method preformed by a mobile communication device for communicating with communication apparatus of a cellular communication system, which communication apparatus is configured to operate a first cell using a first component carrier and a second cell using a second component carrier, wherein a control channel and reference signals of a first type are provided using the first component carrier, wherein the control channel and the reference signals of the first type are not provided, and reference signals of a second type are provided using the second component carrier, and wherein: the method comprises: communicating with the communication apparatus using the first component carrier; performing measurements on the reference signals of the first type for the first component carrier, for use in determining a signal strength of the first component carrier; performing measurements on the reference signals of the second type for the second component carrier, for use in determining a signal strength of the second component carrier; reporting, to the communication apparatus, results of the measurements performed; and receiving, from said communication apparatus, information for allowing said mobile communication device to communicate using said second component carrier in said second cell in the event that the results of measurements of the reference signals of the second type for the second component carrier, indicate that said mobile communication device is within an area covered by said second cell.

The reference signals of the first type may be provided in a control region and in a data region of sub-frames communicated using the first component carrier; and the reference signals of the second type may be provided in a data region and may not be provided in a control region of sub-frames communicated using the second component carrier.

According to one aspect of the invention there is provided a computer program product comprising instructions to perform a method as recited above.

According to one aspect of the invention there is provided communication apparatus for a cellular communication system, the communication apparatus comprising: a controller operable to operate a first cell using a first component carrier and a second cell using a second component carrier, wherein a control channel and reference signals of a first type are provided using the first component carrier, and wherein the control channel and the reference signals of the first type are not provided, and reference signals of a second type are provided, using the second component carrier; a communications module operable to communicate with a mobile communication device using the first component carrier; a communications module operable to communicate with the mobile communication device using the second component carrier; a receiver module operable to receive, from the mobile communication device, results of measurements performed on the reference signals of the first type for the first component carrier and results of measurements performed on the reference signals of the second type for the second component carrier; a determiner operable to determine, from the results of the measurements performed on the reference signals of the second type, whether or not said mobile communication device is within an area covered by said second cell; and means for transmitting to the mobile communication device, in dependence on whether or not said mobile communication device is within an area covered by said second cell, information for allowing said mobile communication device to communicate using said second component carrier in said second cell.

According to one aspect of the invention there is provided a mobile communication device for communicating with communication apparatus of a cellular communication system, which communication apparatus is configured to operate a first cell using a first component carrier and a second cell using a second component carrier, wherein a control channel and reference signals of a first type are provided using the first component carrier, wherein the control channel and the reference signals of the first type are not provided, and reference signals of a second type are provided using the second component carrier, and wherein: the mobile communication device comprises: a communications module operable to communicate with the communication apparatus using the first component carrier; a communications module operable to communicate with the communication apparatus using the second component carrier; a measurement module operable to perform measurements on the reference signals of the first type for the first component carrier, for use in determining a signal strength of the first component carrier and operable to perform measurements on the reference signals of the second type for the second component carrier, for use in determining a signal strength of the second component carrier; a reporting module operable to report, to the communication apparatus, results of the measurements performed; and a receiver operable to receive, from said communication apparatus, information for allowing said mobile communication device to communicate using said second component carrier in said second cell in the event that the results of measurements of the reference signals of the second type for the second component carrier, indicate that said mobile communication device is within an area covered by said second cell.

Aspects of the invention extend to computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently (or in combination with) any other disclosed and/or illustrated features. In particular but without limitation the features of any of the claims dependent from a particular independent claim may be introduced into that independent claim in any combination or individually.

BRIEF DESCRIPTION OF THE DRAWINGS

Embodiments of the invention will now be described by way of example only with reference to the attached figures in which.

BEST MODE FOR EMBODYING THE INVENTION

Overview

Figure 1:
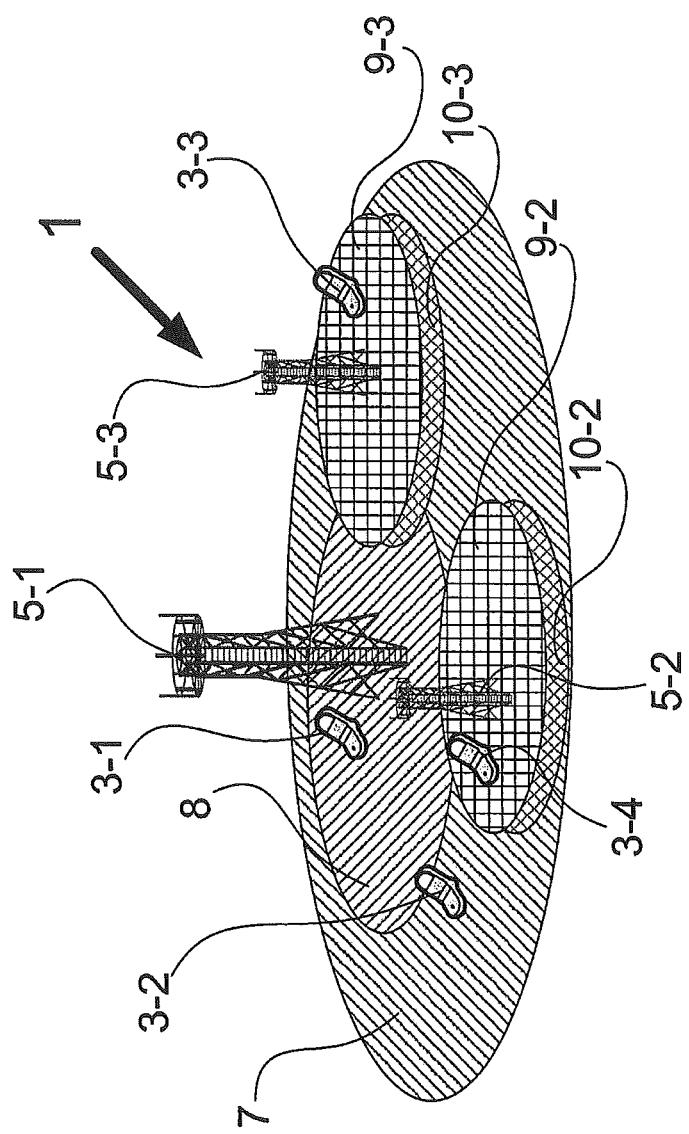
FIG. 1 schematically illustrates a telecommunication system.

FIG. 1 schematically illustrates a mobile (cellular) telecommunication system 1 in which a user of any of a plurality of mobile communication devices 3-1, 3-2, 3-3, 3-4, can communicate with other users via one or more of a plurality of base stations 5-1, 5-2 and 5-3. In the system illustrated in FIG. 1, each base station 5 shown is an Evolved Universal Terrestrial Radio Access Network (E-UTRAN) base station capable of operating in a multi-carrier environment.

In FIG. 1, the base station labelled 5-1 comprises a so called 'macro' base station operating a plurality of relatively geographically large 'macro' cells 7, 8 using respective component carriers (CCs) C1, C2, of a component carrier set. In this embodiment, the macro base station 5-1 operates component carrier C1 as a primary component carrier on which a primary cell (PCell) 7 is provided, and component carrier C2 as a secondary component carrier on which a secondary cell (SCell) 8 is provided. The PCell 7 has a larger geographical coverage than the SCell 8. The difference in the size of the PCell 7 and SCell 8 may be by design (e.g. as a result of using a lower transmit power for component carrier C2) or may result from one or more radio environmental factors affecting the primary carrier C1 and secondary carrier C2 to different extents (e.g. path loss affecting a lower frequency primary carrier C1 to a lesser extent than a higher frequency secondary carrier C2).

The other base stations 5-2, 5-3 shown in FIG. 1, each comprises a so called 'pico' base station operating a plurality of 'pico' cells 9-2, 9-3, 10-2, 10-3, using a component carrier set having component carriers (CCs) C1, C2 corresponding in frequency to those used by the macro-base station 5-1. Each pico base station 5-2, 5-3 operates a respective pico primary cell (PCell) 9-2, 9-3 on component carrier C2 and a respective pico secondary cell (SCell) 10-2, 10-3 on component carrier C1. Thus, the pico Pcells 9 share substantially the same frequency band as the macro Scell 8, and the pico Scells 10 share substantially the same frequency band as the macro Pcell 7. As seen in FIG. 1, the power of the carriers C1, C2 used to provide the pico cells 9, 10 is set such that the geographical coverage of the pico PCells 9, of this example, are substantially co-incident with the geographical coverage of the pico SCells 10.

The power used to provide pico cells 9, 10 is low relative to the power used for the macro cells 7, 8 and the pico cells 9, 10 are therefore small relative to the macro cells 7, 8. As shown in FIG. 1, in this example the geographical coverage of each of the pico cells 9, 10 falls completely within the geographical coverage of the macro PCell 7 and overlaps partially with the geographical coverage of the macro SCell 7.

Figure 2:
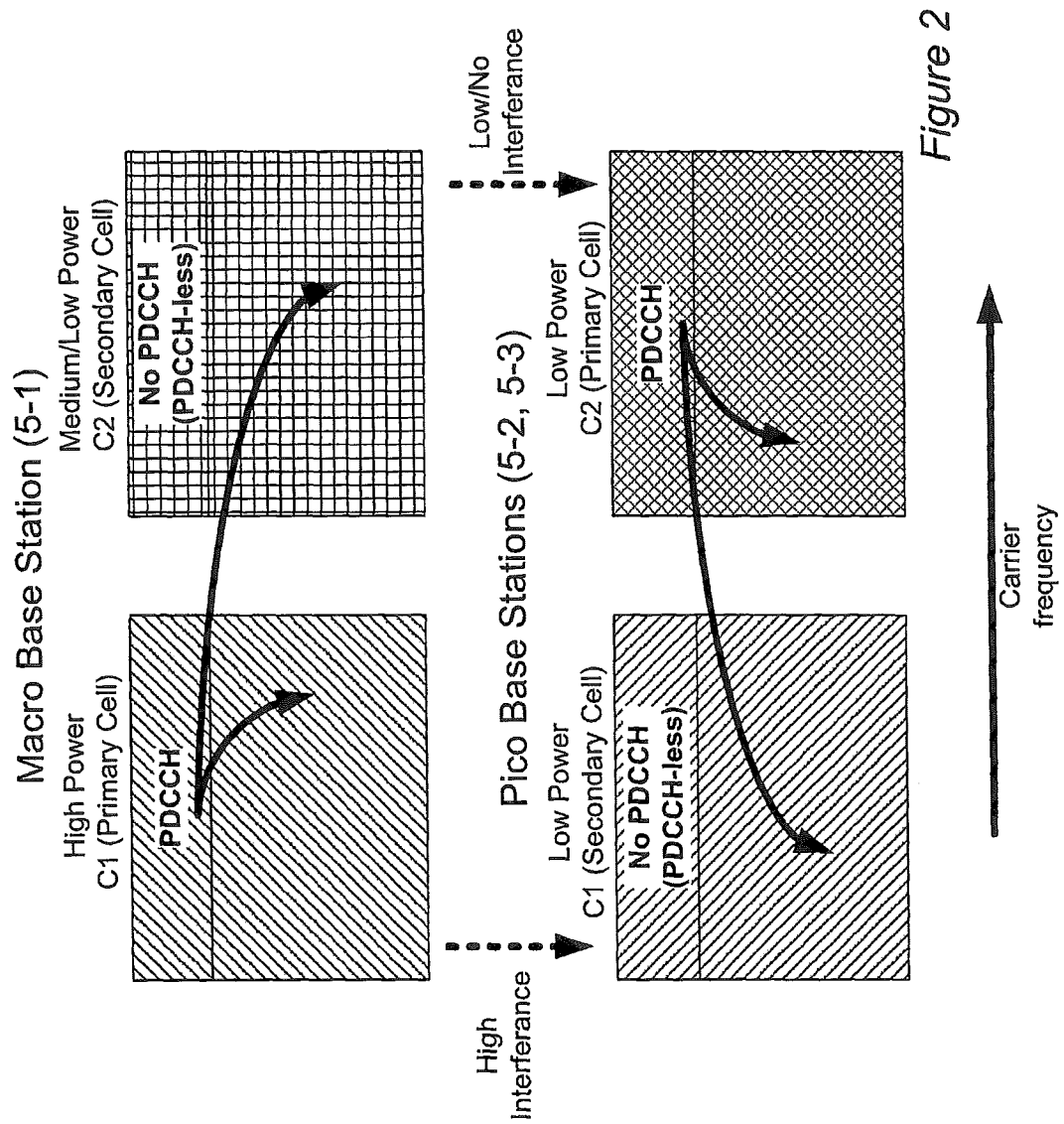
FIG. 2 illustrates configuration of component carriers for the telecommunication system of FIG. 1.

Referring to FIG. 2, in which the configuration of the component carriers for each of the cells is illustrated, it will be apparent that there is a potential for relatively high communication interference between the macro PCell 7 and each of the pico SCells 10. The risk of interference is high because the macro PCell 7 and pico SCells 10 operate in co-incident geographical regions and use a common component carrier frequency. Further, the strength of communication signals from the macro base station 5-1, in the geographical are covered by each pico Scell 10, may be comparable to communication signals from the respective pico base station 5-2, 5-3 because of the relatively high power used by the macro base station 5-1 compared to that used by the pico base stations 5-2, 5-3. Whilst there is also the potential for some interference between the macro SCell 7 and each of the pico PCells 10, any such interference is likely to be relatively small and restricted to the relatively small geographical region in which the macro SCell 7 and pico PCells 10 overlap.

To alleviate the issue of interference, the component carrier C2 used for the macro Scell 8 is operated by the macro base station 5-1 as an extension carrier on which the nature of information that may be transmitted is restricted. Specifically, the component carrier, when operating as the extension carrier may not be used for transmission of any of the following:

a Physical Downlink Control Channel (PDCCH);
   a Physical Hybrid ARQ Indicator Channel (PHICH);
   a Physical Control Format Indicator Channel (PCFICH);
   a Physical Broadcast Channel (PBCH);
   a Primary Synchronization Signal (PSS);
   a Secondary Synchronization Signal SSS; or
   a Common Reference Signal/Cell-specific Reference Signal (CRS).

Accordingly, the extension carrier is effectively a 'PDCCH-less' carrier that cannot be operated as a single (stand-alone) carrier, and must therefore be operated a part of a component carrier set where at least one of the carriers in the set is a stand-alone-capable carrier. The macro base station 5-1 operates carrier C1 as a stand-alone carrier on which the PDCCH is used to schedule the resources of component carrier C2 to be used for communication purposes by a mobile communication device 3 when operating in the macro Scell 8.

The respective component carrier C1 used for each of the pico Scells 10 is also each operated as an extension carrier (as described previously) by the associated pico base station 5-2, 5-3. The respective component carrier C2 used for each of the pico Pcells 9 is operated, as a stand-alone carrier, by the associated pico base station 5-2, 5-3, and is used for cross carrier scheduling of the resources of component carrier C1 to be used for communication purposes by a mobile communication device 3 when operating in the associated pico Scell 10.

Each base station 5 uses Radio Resource Control (RRC) signalling to configure a particular mobile communication device 3 for potential operation in the secondary cell 8, 10 that the base station 5 provides. Once configured in the mobile communication device 3, the SCell 8, is in a deactivated state. In order to activate (and subsequently deactivate) the SCell 8, 10, therefore, the base station 5 uses Media Access Control (MAC) signalling once the SCell 8, 10 has been configured at the mobile communication device 3.

In scenarios, such as that shown for the macro base station 5-1, in which the component (extension) carrier C2 used for the SCell 8 covers a significantly smaller geographical area than the component carrier C1 for the PCell 7, a particular mobile communication device 3 may never enter the geographical area covered by the component (extension) carrier C2 of the SCell 8. In order to avoid unnecessary configuration and/or activation of the SCell 8, therefore, the mobile communication device 3 is configured to determine the signal strength of the component (extension) carrier C2 and to report the results to the macro base station 5-1 so that the macro base station 5-1 can determine when to configure, and/or add/remove, the component (extension) carrier C2 as the SCell 8. Specifically, the mobile communication device 3 is configured to determine and report a measure of the Reference Signal Received Power (RSRP) and the Reference Signal Received Quality (RSRQ) for the component carrier C2 on which the SCell 8 is operated.

Common reference signals (also known as a cell specific reference signals) are transmitted in all downlink sub-frames in a cell supporting a physical downlink shared channel (PDSCH) transmission and operated on a stand-alone carrier. Common reference signals are transmitted in all downlink sub-frames in a cell-supporting non-MBSFN (Multi-Media Broadcast over a Single Frequency Network) transmission. In the case of sub-frames used for transmission with MBSFN, common reference signals are only transmitted in the non-MBSFN region of the MBSFN sub-frame (e.g. the first two symbols). The common reference signals may be transmitted on one or several antenna ports (e.g. antenna ports 0 to 3) of the base station (see 3GPP TS 36.211, v10.2.0, 6.10.1).

Figure 3:
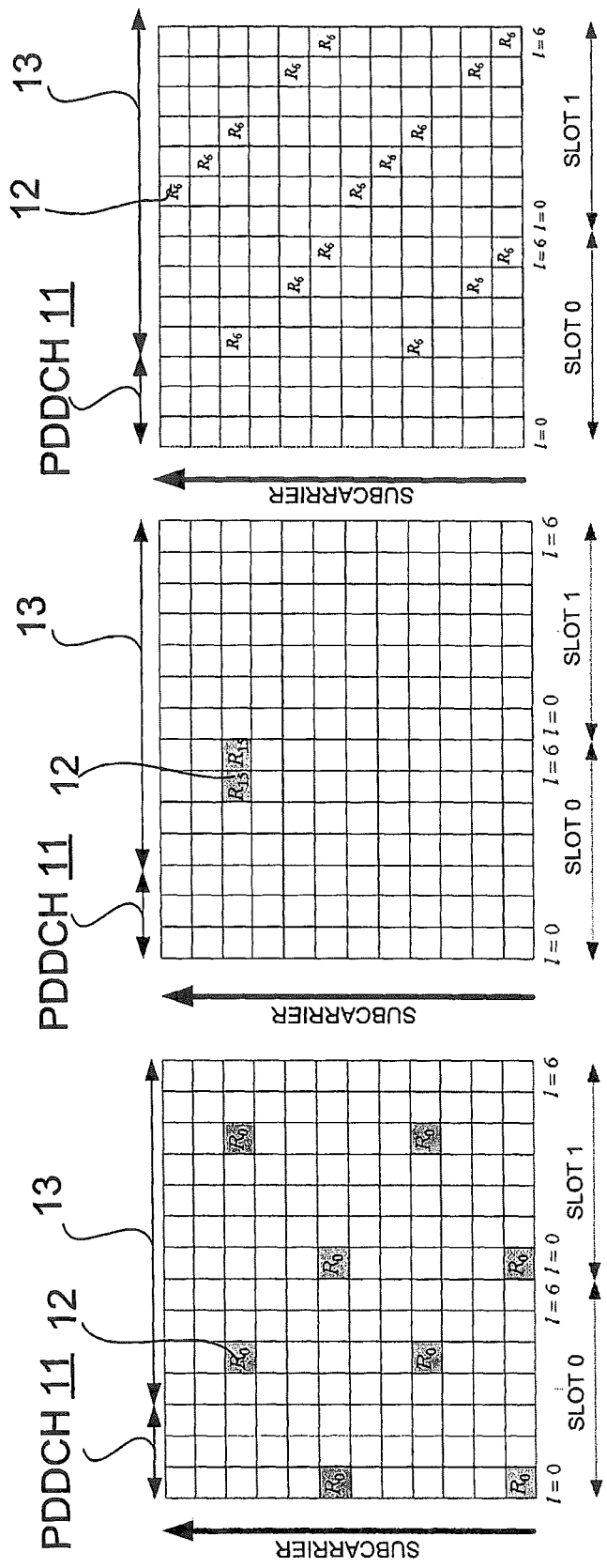
FIGS. 3a to 3c show simplified illustrations of resource grids for different reference signals provided in the telecommunication system of FIG. 1.

FIG. 3a illustrates, generally at 20, a typical resource grid of a sub-frame in which resources allocated for the purposes of common (Cell-specific) reference signalling. As seen in FIG. 3a, CRSs are communicated in eight resources ('symbols') 12 distributed generally evenly throughout both slots of the resource grid using four distinct sub-carrier frequencies (rows) and two distinct symbol numbers (columns) of each slot. The symbols 11 used for the CRS include symbols in the control region 11 allocated for the PDCCH and a data region 13.

In the case of the primary cells 7, 9, each mobile communication device 3 is able to determine a measure of RSRP and/or RSRQ for each component carrier being operated as a stand-alone carrier using a common reference signal (CRS) that is routinely transmitted on such carriers (e.g. as defined in the current release 10 version 3GPP TS 36.133 v10.3.0 sections 9.1.2 and 9.1.5 respectively).

Accordingly, each mobile communication device 3 is able to determine a measure of the RSRP and/or the RSRQ for component carrier C1 as operated by the macro base station 5-1, and for component carrier C2 as operated by the pico base stations 5-2 and 5-3.

However, in the case of the SCells 8, 10, because the component carrier being used is operated as an extension carrier a CRS is not transmitted and therefore cannot be measured by the mobile communication device 3. In the communication system of FIG. 1, however, each mobile communication device 3 is advantageously able to determine a value of the RSRP and the RSRQ, for each extension carrier (component carrier C2 as operated by the macro base station 5-1, and component carrier C1 as operated by each pico base station 5-2, 5-3), based on reference signals other than the CRS, which reference signals are communicated in resources of the resource grid that do not include symbols in the control region 11 allocated for the PDCCH.

Specifically, in this embodiment, each mobile communication device 3 is configured to determine a value of the RSRP and the RSRQ, for a component carrier being operated as an extension carrier, based on Channel State Information-Reference Signals (CSI-RS). CSI-RS are generally configured via higher layer signalling for each component carrier including extension carriers for the purposes of measurements such as rank indicator (RI), precoding matrix indicator (PMI) and channel quality indicator (CQI). In the case of the macro base station 5-1, in order to configure a mobile communication device 3 for the acquisition and reporting of such measurements for the component carrier C2 being operated as the extension carrier, the macro base station 5-1 transmits a measurement configuration message to the mobile communication device 3 on the stand-alone component carrier C1 used for the PCell 7.

In this embodiment, the macro base station 5-1 advantageously makes use of the known CSI-RS Config information element (which forms part of the known PhysicalConfigDedicated information element for Pcells and PhysicalConfigDedicatedSCell for Scells) to identify the CSI-RS configuration to the mobile communication device 3. Macro base station 5-1 also advantageously makes use of the known "MeasConfig" information element (which is transmitted in an RRCConnectionReconfiguration message) to identify the measurements to be performed by the mobile communication device 3, and to identify how the results of the measurements should be reported to the macro base station 5-1 as RSRP/RSRQ values (for reference to these messages/information elements, see the current release 10 version 3GPP TS 36.331 (v 10.2.0)).

FIG. 3b illustrates, generally at 21, a typical resource grid of a sub-frame in which resources allocated for the purposes of channel state information (CSI) reference signalling. As seen in FIG. 3a, CSI-RSs are communicated in two adjacent symbols 12 using just a single sub-carrier frequency and two distinct symbol numbers (for a particular sub-frame other frequencies/symbol numbers are used in other sub-frames) of the first slot only. Unlike CRS signalling, however, the symbols 11 used for the CSI reference signalling include symbols in the data region 13 but do not include symbols in the control region 11 allocated for the PDCCH. Whilst, the current technical perception is that measurement of component carrier strength should use the CRS because of its wider distribution across the resource grid and in the control channel, it has been found that measurements on CSI-RS can be refined to ensure sufficient accuracy for the purposes of determining when a mobile communication device enters a region covered by a secondary cell.

In this embodiment, the mobile communication devices 3 are each configured to use a Radio Resource Control (RRC) based mechanism in which measurements of the CSI-RS are performed by the mobile communication device 3, values representing RSRP and RSRQ are determined from the measurements by the mobile communication device 3, and the results are then reported to the macro base station 5-1 as an RRC measurement report using RRC signalling (e.g. using a measResultSCell field in a MeasResults information element of the RRC MeasurmentReport message referred to in 3GPP TS 36.331 v 10.2.0, section 6.2).

On receipt of the results of the measurement results from the mobile communications device 3, the macro base station 5-1 analyses the result to determine if the mobile communication device 3 has entered the coverage area for the extension carrier C2. If the mobile communication device 3 has entered the coverage area for the extension carrier C2 the macro base station 5-1 signals, to the mobile communication device 3, configuration information for the Scell 8 operated on the extension carrier C2 using appropriate RRC signalling (e.g. using an RRCConnectionReconfiguration message including an sCellToAddModList information element comprising the appropriate SCell radio resource configuration information as referred to in 3GPP TS 36.331 v 10.2.0, section 5.3.10.3b). After the mobile communication device 3 has been configured for operation in the SCell 8, the macro base station 5-1 activates (or subsequently deactivates) the SCell 8 in the mobile communication device 3, when required, using MAC signalling.

If macro base station 5-1 determines that the mobile communication device 3 has left the coverage area for the extension carrier C2, the macro base station 5-1 signals release of the Scell 8 operated on the extension carrier C2 to the mobile communication device 3, using appropriate RRC signalling (e.g. using an RRCConnectionReconfiguration message including an sCellToReleaseList information element comprising information identifying the SCell 8 to be released as referred to in 3GPP TS 36.331, section 5.3.10.3a).

In this embodiment, the measurement period for the measurement of the CSI-RS RSRP/RSRQ for the CSI-RS on the extension carrier is advantageously dependent on the timing parameter scellMeasCycle (for example, five times scellMeasCycle) referred to in 3GPP TS 36.133 v 10.3.0. The mobile communication device 3 continues to perform the RSRP/RSRQ measurements on the extension carrier in accordance with this cycle both while the SCell 8 is not configured at the mobile communication device 3 and while the SCell 8 is configured but deactivated at the mobile communication device 3.

Accordingly, unlike current communication systems, this embodiment advantageously allows efficient selective configuration (or release) of a secondary cell operated on an extension carrier, at a mobile communication device, in dependence on whether or not the mobile communication device has entered the coverage of the extension carrier. Thus, even if the mobile communication device enters a primary cell operated on a first carrier by a base station it will not be configured for communication in a secondary cell on a second—extension—carrier operated by that base station, until the mobile communication device enters the coverage area of that extension carrier.

It will be appreciated that embodiments of the present invention are also particularly advantageous in many other scenarios in which a base station operates different cells which are not geographically co-incident. For example, if a base station operates a first cell on an extension carrier using a first antenna that is directed (sectorised) such that it partially overlaps part (e.g. half the area) covered by a second cell on a second component carrier (and possibly part of the area covered by a third cell operated on a third component carrier).

Base Station

Figure 4:
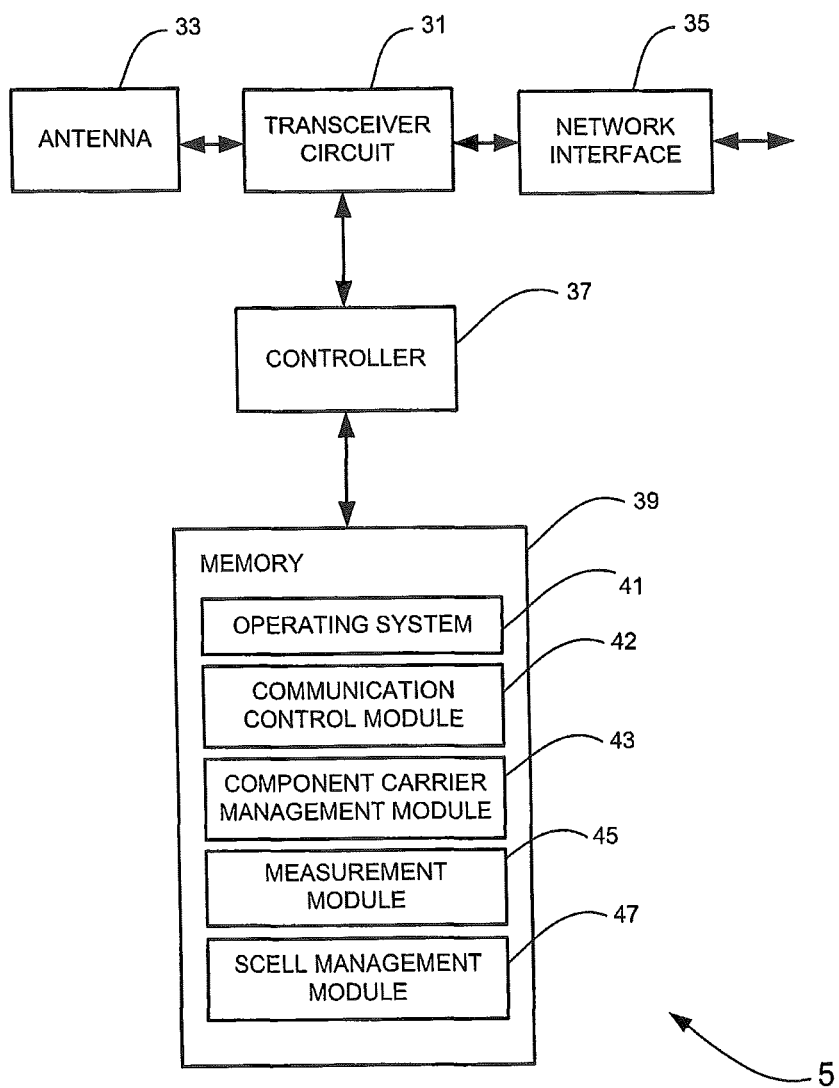
FIG. 4 shows a simplified block diagram of a base station for the telecommunication system of FIG. 1.

FIG. 4 is a block diagram illustrating the main components of the base stations 5 shown in FIG. 1. For clarity, the base stations will be described with reference to the macro base station 5-1, but it will be appreciated that each of the pico base stations 5-2, 5-3 may be configured similarly. The macro base station 5-1 comprises an E-UTRAN multi-carrier capable base station comprising a transceiver circuit 31 which is operable to transmit signals to, and to receive signals from, the mobile communication devices 3 via at least one antenna 33. The base station 5-1 is also operable to transmit signals to and to receive signals from a core network via a network interface 35. The operation of the transceiver circuit 31 is controlled by a controller 37 in accordance with software stored in memory 39.

The software includes, among other things, an operating system 41, a communication control module 42, a component carrier management module 43, measurement module 45 and an SCell management module 47.

The communication control module 42 is operable to control communication with the mobile communication devices 3 on the component carriers (CCs) C1, C2, of its component carrier set. The component carrier management module 43 is operable to manage the use of the component carriers C1, C2 and in particular the configuration and operation of the PCell 7 and SCell 8 and the operation of the component carrier for the SCell 8 as an extension carrier. The measurement module 45 communicates with the mobile communication device 3 to configure the mobile communication device 3 to initiate measurement of the CSI-RS on the extension carrier for the purposes of determining the RSRP and RSRQ of the extension carrier. The measurement module 45 also analyses measurement reports received from the mobile communication device 3, to extract the RSRP and RSRQ measurement results, in order to determine whether or not the mobile communication device 3 is within sufficient range of the extension carrier for SCell configuration. The SCell management module 47 manages communication with the mobile communication device 3 for the configuration of the SCell 8 and its activation/deactivation, at the mobile communication device 3, when the mobile communication device 3 is within sufficient range of the extension carrier as indicated by the RSRP and RSRQ measurements. The SCell management module 47 also manages communication with the mobile communication device 3 for the release of the SCell 8 at the mobile communication device 3, when the mobile communication device 3 is no longer within sufficient range of the extension carrier as indicated by the RSRP and RSRQ measurements.

In the above description, the base station 5-1 is described for ease of understanding as having a number of discrete modules. Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

Mobile Communication Device

Figure 5:
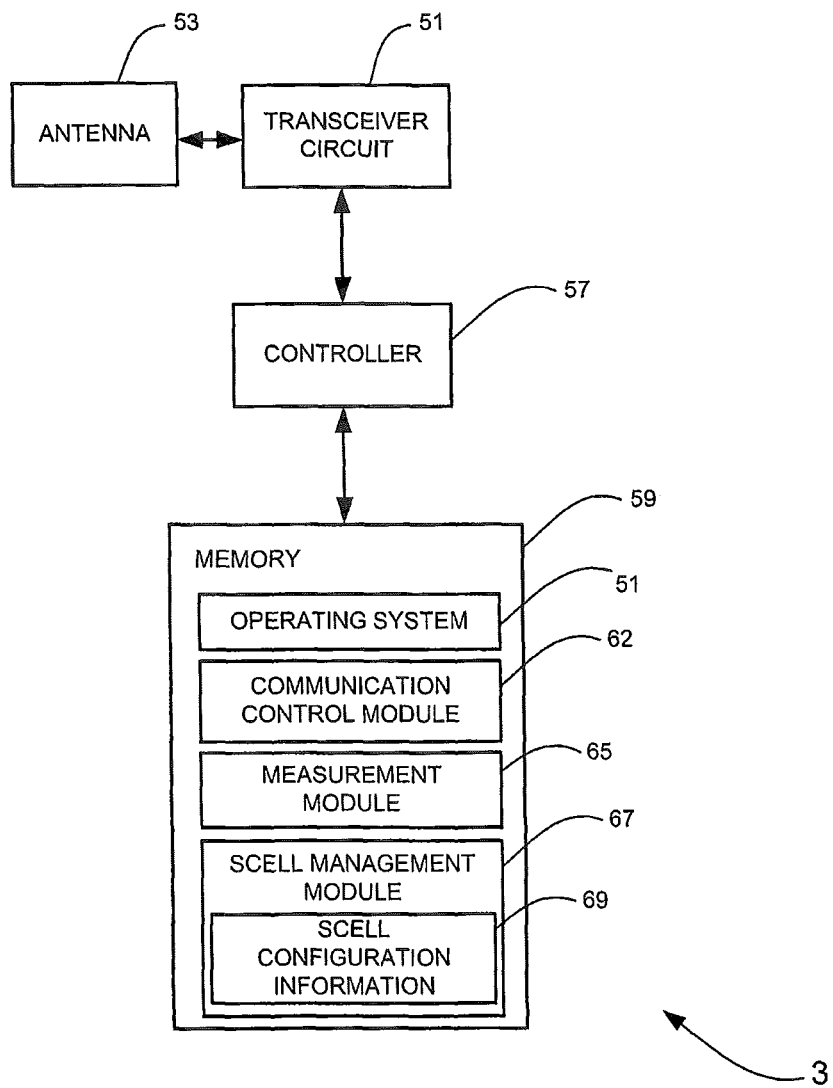
FIG. 5 shows a simplified block diagram of a mobile communication device for the telecommunication system of FIG. 1.

FIG. 5 is a block diagram illustrating the main components of the mobile communication devices 3 shown in FIG. 1. Each mobile communication device 3 comprises a mobile (or 'cell' telephone) capable of operating in a multi-carrier environment. The mobile communication device 3 comprises a transceiver circuit 51 which is operable to transmit signals to, and to receive signals from, the base stations 5 via at least one antenna 53. The operation of the transceiver circuit 51 is controlled by a controller 57 in accordance with software stored in memory 59.

The software includes, among other things, an operating system 51, a communication control module 62, a measurement module 65, and an SCell configuration module 67.

The communication control module 62 is operable for managing communication with the base stations 5 on the associated component carriers (CCs) C1, C2. The measurement module 65 receives measurement configuration information from the base station 5 for the purposes of configuring the mobile communication device 3 to take measurements of the CSI-RS on the extension carrier for the purposes of determining the RSRP and RSRQ of the extension carrier. The measurement module 65 manages performance of the measurements, determines the RSRP and RSRQ, generates associated measurement reports and transmits the generated reports to the base station 5. The measurement module 65 also manages the performance of other measurements such as, for example, measurements of the CRS communicated on a component carrier used for operating a PCell.

The SCell management module 67 manages communication with the base station 5 for the purposes of configuring the SCell 8, and activating/deactivating it, at the mobile communication device 3, when the mobile communication device 3 is within sufficient range of the extension carrier. The SCell management module 67 also manages communication with the base station 5 for the purposes of releasing the SCell 8 at the mobile communication device 3, when the mobile communication device 3 is no longer within sufficient range of the extension carrier. On receipt of an SCell configuration message from the base station 5, the SCell management module 67 stores associated SCell configuration information 69 in memory.

In the above description, the mobile communication device 3 is described for ease of understanding as having a number of discrete modules. Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

Operation

Figure 6:
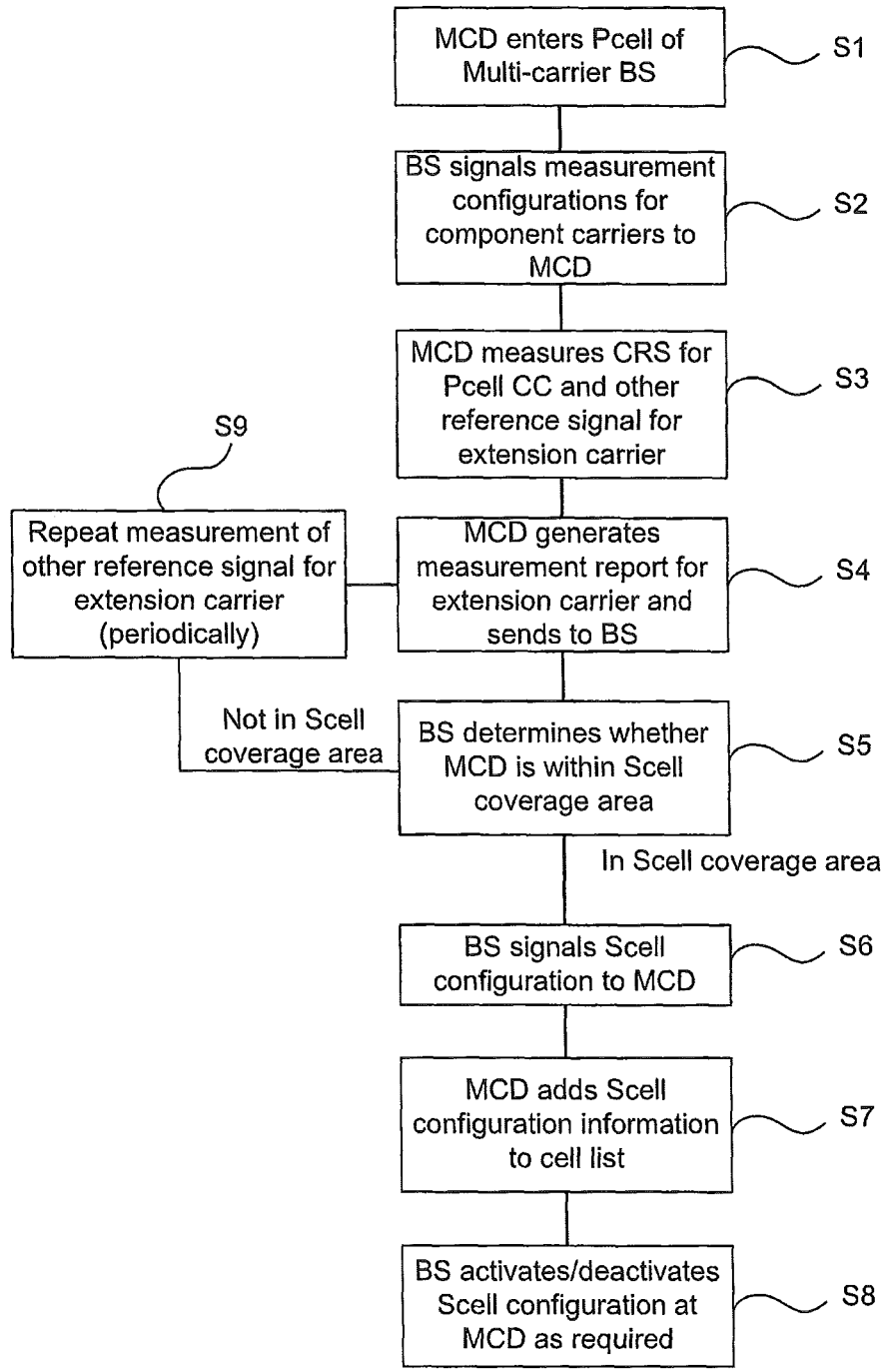
FIG. 6 shows a simplified flow chart illustrating operation of the telecommunication system of FIG. 1.

FIG. 6 is a flow chart illustrating operation of the communication system 1 to configure a mobile communication device (MCD) 3 for operation in a secondary cell of the macro base station (BS) 5-1 in accordance with the current embodiment.

As seen in FIG. 6, when the mobile communication device 3 enters the primary cell 7 of the base station 5-1 at S1, the base station 5-1 signals appropriate measurement configuration information to the mobile communication device 3 at S2. In this embodiment the measurement configuration information comprises information for the CSI-RS on the extension carrier which the base station 5-1 uses to operate its secondary cell 8. Thus, the mobile communication device 3 not only measures the CRS of the component carrier used for the primary cell 7 but also measures a different type of reference signal the CSI-RS in this embodiment for the extension carrier as S3. The mobile communication device 3 generates an associated measurement report comprising the results of the measurements (in this embodiment values of RSRP and RSRQ) and sends it to the base station 5-1 at S4. The base station 3 then determines, from the measurement results, whether or not the mobile communication device 3 is within the coverage area of the secondary cell 8 at S5. If the mobile communication device 3 is within the coverage area of the secondary cell 8, then the base station 5-1 signals the configuration information for the secondary cell 8 to the mobile communication device 3 at S6. On receipt of this information, the mobile communication device 3 stores the secondary cell configuration information for use when the secondary cell 8 is activated on that mobile communication device 3 at S7. The base station 5-1 is then able to signal the mobile communication device 3 to activate (and subsequently deactivate) the secondary cell configuration information, if required, at S8. The mobile communication device continues to periodically measure the CSI-RS (e.g. as shown at S9) and report the results. If the mobile communication device 3 is within the coverage area of the secondary cell 8, then the base station 3 continues to monitor the periodic measurement reports sent from the mobile communication device 3 to determine when the mobile communication device 3 does enter the coverage area of the secondary cell's extension carrier.

Modifications and Alternatives

A detailed embodiment and has been described above. As those skilled in the art will appreciate, a number of modifications and alternatives can be made to the above embodiment and variations whilst still benefiting from the inventions embodied therein.

In the above embodiment or another embodiment, for example, the base stations 5 and mobile communication devices 3, may be configured to use measurements of a different signal, in addition or as an alternative to measurements based on the CSI-RS, base upon which the base station 5 can determine whether or not the mobile communication device is within range of the extension carrier it operates. For example, the base stations 5 and mobile communication devices 3 may be configured to use measurements of Positioning Reference Signals (PRSs) (e.g. as defined in 3GPP TS 36.211, v 10.2.0, section 6.10.4).

Positioning reference signals are only transmitted in resource blocks in downlink sub-frames configured for positioning reference signal transmission. If both normal and MBSFN sub-frames are configured as positioning sub-frames within a cell, the OFDM symbols in a MBSFN sub-frame configured for positioning reference signal transmission use the same cyclic prefix as used for sub-frame number zero. If only MBSFN sub-frames are configured as positioning sub-frames within a cell, the OFDM symbols configured for positioning reference signals in these sub-frames use an extended cyclic prefix length. In a sub-frame configured for positioning reference signal transmission, the starting positions of the OFDM symbols configured for positioning reference signal transmission are substantially identical to those in a sub-frame in which all OFDM symbols have the same cyclic prefix length as the OFDM symbols configured for positioning reference signal transmission. Positioning reference signals are transmitted on a dedicated antenna port (typically antenna port 6).

FIG. 3c illustrates, generally at 23, a typical resource grid of a sub-frame in which resources allocated for the purposes of positioning reference signalling. As seen in FIG. 3a, PRSs are typically communicated in symbols 12 distributed throughout the region of the sub-frame that has not been allocated for the PDCCH, using most of the sub-carrier frequencies and most symbol numbers somewhere in the two slots (for a particular sub-frame other frequencies/symbol numbers are used in other sub-frames). Unlike CRS signalling, therefore, the symbols 11 used for the positioning reference signalling include symbols in the data region 13 but do not include symbols in the control region 11 allocated for the PDCCH. As mentioned above, the current technical perception is that measurement of component carrier strength should use the CRS because of its wider distribution across the resource grid including the control channel. It has been found, however, that measurements on PRS can be refined to ensure sufficient accuracy for the purposes of determining when a mobile communication device enters a region covered by a secondary cell. Using the PRS has a wider resource distribution the CSI-RS but using PRS is more involved and is likely to require more significant changes to current practice to implement its use.

In the case of PRSs, for example, the communication system 1 may comprise a so called 'Serving Mobile Location Center' (SMLC), which is a network element that calculates network-based location of a mobile communications device. In such an embodiment, the SMLC provides a list of cells to be included in Reference Signal Time Difference (RSTD) measurements for an Observed Time Difference Of Arrival (OTDOA) measurements. The SMLC determines that the extension carrier should be included in the extension carriers for the OTDOA measurements and identifies the configuration of PRSs broadcast on the extension carrier(s) to the mobile communication device 3.

In this embodiment, when a mobile communications device 3 enters the primary cell 7 of the macro base station 5-1, the macro base station 5-3 informs the mobile communication device 3 of the existence of the extension carrier C2 on which the secondary cell operates using RRC signalling (for example using an RRC MeasConfig message). The mobile communication device 3 performs measurements of the PRS broadcast on the extension carrier, determines RSRP/RSRQ values for the extension carrier from these measurements, and reports the RSRP/RSRQ values to the base station 5-1 in a measurement report as described previously. Because it is the SMLC and not the base station 5-1 that initiates the measurements, the base station 5-1 does not know that the measurements are being carried out. Accordingly, in this embodiment, the mobile communication device 3 infant's the base station 5-1 that it is performing the OTDOA measurements using appropriate RRC signalling (for example using the InterFreqRSTDMeasurementIndication message defined in 3GPP TS 36.331, v 10.2.0, section 6.2.1) to indicate that the mobile communication is going to start (or subsequently stop OTDOA inter-frequency RSTD measurement, which requires measurement gaps (e.g. as specified in 3GPP TS 36.133). The RRC signalling also indicates the smallest offset of the PRS positioning occasions in the carrier frequency (carrierFreq IE in the InterFreqRSTDMeasurementIndication message) for which the mobile communication device 3 needs to perform the inter-frequency RSTD measurements.

The SMLC may either be a separate network element or may be integrated into the functionality of a base station or other communication node.

It will also be appreciated, that the base stations 5 and mobile communication devices 3 may be configured to use a dedicated reference signal provided on the extension carrier for the purposes of providing RSRP and RSRQ measurements to the base station 5 as an alternative to or in addition to the PRS and/or CSI-RS.

Further, although RRC based measurement and reporting of the RSRP and RSRQ is particularly advantageous, it will be appreciated that measurement may be based in other layers, for example, the physical and/or MAC layers. Specifically, the mobile communication device 3 may perform CQI measurements and report the results to the base station 5 on the component carrier of the primary cell. The base station may then translate the CQI report into an RRC measurement report (including RSRP/RSRQ values) through inter-layer interaction within the base station 5. The base station 5 can then use the information in the RRC measurement report to determine when to configure the secondary cell and when to release the secondary cell configuration at the mobile communication device 3.

Whilst, in current communication systems, CQI reports include measurements when a component carrier frequency has been activated, in the current embodiment, CQI measurements will also be carried out when the secondary cell is not configured and/or has not been activated.

It will be appreciated that although the communication system 1 is described in terms of base stations 5 operating as macro or pico base stations, the same principles may be applied to base stations operating as femto base stations, relay nodes providing elements of base station functionality, or other such communication nodes.

It will further be appreciated that although the embodiments described above advantageously reuse known parameters defined in the relevant standards (e.g. the measurement cycle being based on the parameter scellMeasCycle) a dedicated parameter may be defined. Moreover, the measurement cycle is based on scellMeasCycle it may be any suitable multiple of scellMeasCycle for example any appropriate integer or fraction multiple (e.g. ¼, ½, 1, 2, 3, 5, 10, 15, 20 anywhere therebetween).

In the above embodiments, a mobile telephone based telecommunications system was described. As those skilled in the art will appreciate, the signalling techniques described in the present application can be employed in other communications system. Other communications nodes or devices may include user devices such as, for example, personal digital assistants, laptop computers, web browsers, etc. As those skilled in the art will appreciate, it is not essential that the above described relay system be used for mobile communications devices. The system can be used to extend the coverage of base stations in a network having one or more fixed computing devices as well as or instead of the mobile communicating devices.

In the embodiments described above, the base stations 5 and mobile communication devices 3 each include transceiver circuitry. Typically, this circuitry will be formed by dedicated hardware circuits. However, in some embodiments, part of the transceiver circuitry may be implemented as software run by the corresponding controller.

In the above embodiments, a number of software modules were described. As those skilled in the art will appreciate, the software modules may be provided in compiled or un-compiled form and may be supplied to the base station or the relay station as a signal over a computer network, or on a recording medium. Further, the functionality performed by part or all of this software may be performed using one or more dedicated hardware circuits.

Various other modifications will be apparent to those skilled in the art and will not be described in further detail here.

This application is based upon and claims the benefit of priority from United Kingdom patent application No. 1111374.3, filed on Jul. 4, 2011, the disclosure of which is incorporated herein in its entirety by reference.

The invention claimed is:

1. A base station for a communication system, the base station comprising:
   a memory storing instructions; and
   at least one processor configured to execute the instructions to:
      communicate with a user equipment (UE) in a primary cell using a primary component carrier, and communicate with the UE in at least one secondary cell using at least one secondary component carrier, wherein the primary component carrier and the at least one secondary component carrier originate from the base station;
      transmit measurement configuration information to the UE, the transmitted measurement configuration information comprising at least one information element for configuring the UE to perform a measurement of a reference signal, and a secondary cell measurement cycle parameter for at least one deactivated secondary cell, whereby the UE is configured to perform the measurement of the reference signal on the at least one secondary component carrier for the at least one deactivated secondary cell in accordance with a measurement period that is an integer multiple of the secondary cell measurement cycle parameter provided in the measurement configuration information, the integer being 5 or 3; and
      activate or deactivate the at least one secondary cell of the base station for the UE.

2. A user equipment (UE) for communicating with a base station, wherein the UE comprises:
   a memory storing instructions; and
   at least one processor configured to execute the instructions to:
      communicate with the base station using a primary component carrier, and communicate with the base station using a secondary component carrier;
      receive measurement configuration information from the base station, the measurement configuration information being information arranged to configure how the UE performs a measurement of a reference signal, and the measurement configuration information comprising a secondary cell measurement cycle parameter for at least one deactivated secondary cell, whereby the UE is configured to perform the measurement of the reference signal on the secondary component carrier for the at least one deactivated secondary cell in accordance with a measurement period that is an integer multiple of the secondary cell measurement cycle parameter provided in the measurement configuration information, the integer being 5 or 3; and
      send to the base station, a measurement report based on the received measurement configuration information.

3. A communication system comprising at least one base station the base station comprising:
   a memory storing first instructions; and
   at least one processor configured to execute the first instructions to:
      communicate with a user equipment (UE) in a primary cell using a primary component carrier, and communicate with the UE in at least one secondary cell using at least one secondary component carrier, wherein the primary component carrier and the at least one secondary component carrier originate from the base station;
      transmit measurement configuration information to the UE, the transmitted measurement configuration information being information arranged to configure how the UE performs measurements, the transmitted measurement configuration information comprising at least one information element for configuring the UE to perform measurements of reference signals, and a secondary cell measurement cycle parameter for at least one deactivated secondary cell, whereby the UE is configured to perform measurements of reference signals on the at least one secondary component carrier for the at least one deactivated secondary cell in accordance with a measurement period that is an integer multiple of the secondary cell measurement cycle parameter provided in the measurement configuration information, the integer being 5 or 3; and
      activate or deactivate the at least one secondary cell of the base station for the UE;
   wherein the UE comprises:
      a memory storing second instructions; and
      at least one processor configured to execute the second instructions to:
         communicate with the base station using the primary component carrier;

communicate with the base station using the secondary component carrier;

receive the measurement configuration information from the base station, the received measurement configuration information being information arranged to configure how the UE performs measurements, the received measurement configuration information comprising the at least one information element for configuring the UE to perform measurements of reference signals, and the secondary cell measurement cycle parameter for the at least one deactivated secondary cell, whereby the UE is configured to perform measurements of reference signals on the at least one secondary component carrier for the at least one deactivated secondary cell in accordance with the measurement period that is the integer multiple of the secondary cell measurement cycle parameter provided in the measurement configuration information; and send to the base station, a measurement report based on the received measurement configuration information.

4. A non-transitory computer readable recording medium comprising instructions operable to program a programmable processor to implement a base station according to claim 1.

5. A method performed by a base station, the method comprising:

communicating with a user equipment (UE) in a primary cell of the base station using a primary component carrier;

communicating with the UE in at least one secondary cell of the base station using at least one secondary component carrier;

wherein the primary component carrier and the at least one secondary component carrier originate from the base station;

transmitting measurement configuration information to the UE, the transmitted measurement configuration information comprising at least one information element for configuring the UE to perform a measurement of a reference signal, and a secondary cell measurement cycle parameter for at least one deactivated secondary cell, whereby the UE is configured to perform the measurement of the reference signal on the at least one secondary component carrier for the at least one deactivated secondary cell in accordance with a measurement period that is an integer multiple of the secondary cell measurement cycle parameter provided in the measurement configuration information, the integer being 5 or 3, activating or deactivating the secondary cell of the base station for the UE.

6. A method performed by a user equipment (UE) for communicating with a base station, wherein the method comprises:

communicating with the base station using a primary component carrier;

communicating with the base station using a secondary component carrier;

receiving measurement configuration information from the base station, the received measurement configuration information comprising at least one information element for configuring the UE to perform a measurement of a reference signal, and a secondary cell measurement cycle parameter for at least one deactivated secondary cell, whereby the UE is configured to perform the measurement of the reference signal on the secondary component carrier for the at least one deactivated secondary cell in accordance with a measurement period that is an integer multiple of the secondary cell measurement cycle parameter provided in the measurement configuration information, the integer being 5 or 3;

and sending to the base station, a measurement report based on the received measurement configuration information.

7. A non-transitory computer readable recording medium comprising instructions for executing a method according to claim 5.

* * * * *

UNITED STATES PATENT AND TRADEMARK OFFICE
CERTIFICATE OF CORRECTION

PATENT NO. : 11,146,941 B2  
APPLICATION NO. : 14/129152  
DATED : October 12, 2021  
INVENTOR(S) : Vivek Sharma et al.

Page 1 of 1

It is certified that error appears in the above-identified patent and that said Letters Patent is hereby corrected as shown below:

On the Title Page

Delete "(73) Assignee: TOKYO CORPORATION, Tokyo (JP)"  
Insert --(73) Assignee: NEC CORPORATION, Tokyo (JP)--

Signed and Sealed this  
Twelfth Day of April, 2022

Drew Hirshfeld  
*Performing the Functions and Duties of the*  
*Under Secretary of Commerce for Intellectual Property and*  
*Director of the United States Patent and Trademark Office*